Nov. 24, 1970   H. HENKEL   3,543,287
EXTENSION FITTING FOR CONTAINERS
Filed Nov. 18, 1968
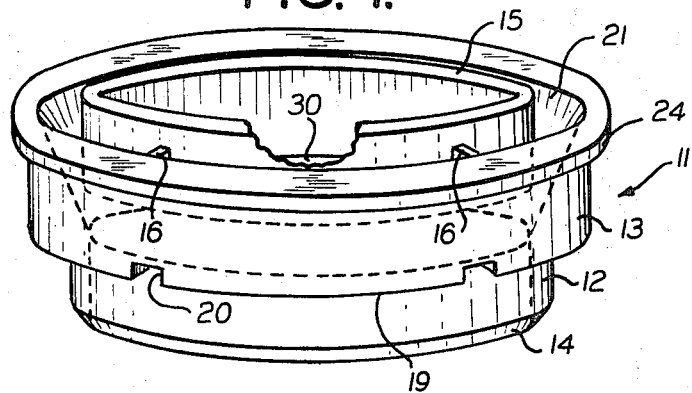
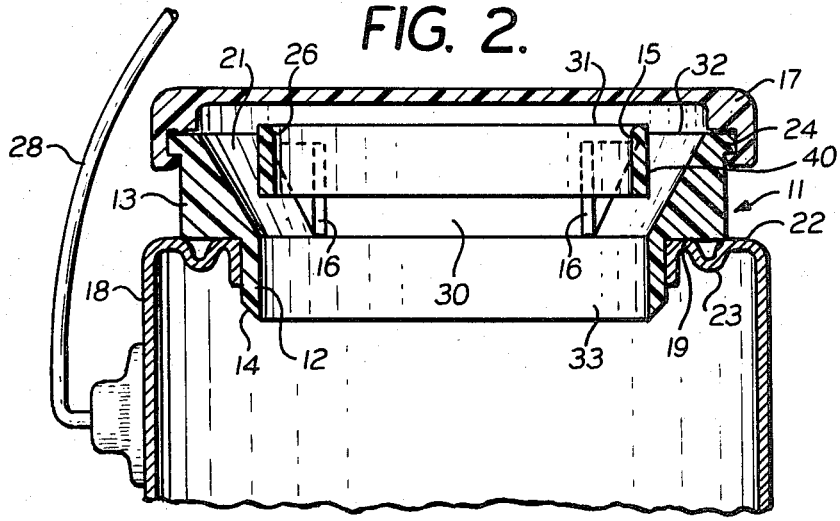
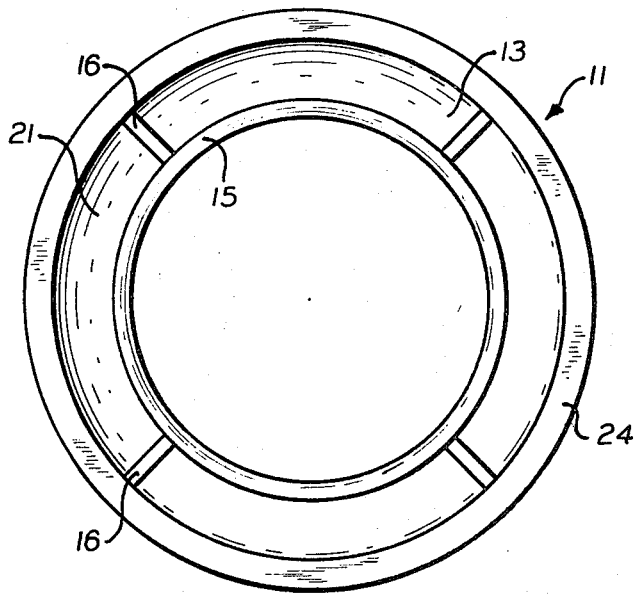
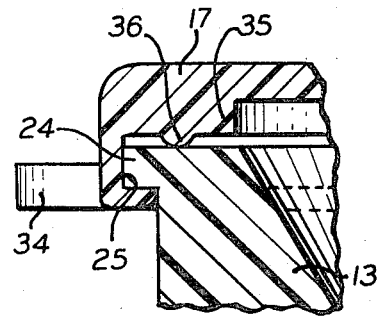
INVENTOR
HENRY HENKEL
BY
Burgess Dinklage & Sprung
ATTORNEYS

United States Patent Office 3,543,287
Patented Nov. 24, 1970

3,543,287
EXTENSION FITTING FOR CONTAINERS
Henry Henkel, 430 E. 63rd St., New York, N.Y. 10021
Filed Nov. 18, 1968, Ser. No. 776,573
Int. Cl. B65d 25/00
U.S. Cl. 220—90                7 Claims

ABSTRACT OF THE DISCLOSURE

An extension fitting for containers, e.g. paint cans, including a body portion, and wiper ring, and if desired, a closure. The body portion can be mounted on the container in tight fitting relation with a collar thereof extending upwardly from the container opening. The collar has an upwardly extending diverging inner surface. A wiper ring is disposed within and spaced from the collar, permitting drainage from the outside of the wiper ring to the container. The wiper ring is positioned so that the body portion can be conveniently molded in one piece.

BACKGROUND OF THE INVENTION

This invention relates to extension fittings for containers, e.g. paint cans.

Numerous designs have been proposed for extension fitting for paint cans, particularly since the introduction of plastics. The availability of that material apparently suggested the feasibility of the fittings. The designs proposed however, have various shortcomings involving impractical constructions from the production cost standpoint, or designs which result in inconvenience during use or because the fittings must be removed, cleaned, and stored each time they are used.

The invention is directed to providing a construction which is free of the disadvantages of the designs proposed heretofore. The construction hereof is such that the fitting can be produced at a reasonable cost from available plastics such as phenolics, polyolefins, etc. The construction can be in one piece, including a body portion, wiper ring, and supports for the wiper ring and this integral construction is compatible with known low cost production techniques. Further, the construction can be such that the opening area of the container is not substantially reduced and access to the contents, either for stirring or removal is not interfered with. Moreover, the wiper ring is provided so that the likelihood of paint running over the outside of the fitting and container is eliminated or reduced. Additionally, the extension can be provided so that it fits tightly, in sealing relation, on the container, and, as indicated, a closure can be provided. Thus, in a preferred form of the invention, it is not necessary to remove the fitting following each use. It can, however, be removed when desired, as for example when the contents are used up and it is desired to discard the container and utilize the fitting on another container.

THE INVENTION

The extension fitting of the invention comprises a hollow cylindrical body portion, a wiper ring, and ring supports which serve to mount the wiper ring on the body portion. The body portion includes a lower member, which can be formed as a thin walled sleeve, for insertion into the open top of the container to mount the fitting on the container in tight fitting relation.

A thin walled sleeve construction for the insert member permits mounting the fitting without appreciably reducing the area of the container opening. The sleeve outer surface can frictionally engage the inner surface of the container top portion over the entire periphery of the container opening, and in this manner, together with the resilience of the plastic, a tight fitting relation can be obtained. The body portion also includes an upper member or collar formed as an extension of the insert member and integral therewith, and having an upwardly diverging inner surface. The wiper ring is disposed inwardly of the collar upper end portion and spaced from the collar. The ring supports are integral with the body portion and are disposed at circumferentially spaced intervals about the ring, projecting outwardly from the ring to engagement with the body portion. To facilitate molding of the fitting or an integral unit, the outwardly disposed surface of the wiper ring is either aligned with or inwardly of the inwardly disposed surface of the insert member. Finally, the lower end of the wiper ring is spaced from the body portion so that an opening is provided for drainage from the collar to the container.

BRIEF DESCRIPTION OF THE DRAWINGS

An embodiment of the invention is shown in the accompanying drawing, wherein:

FIG. 1 is a perspective view of the extension;
FIG. 2 is a cross-section of the extension, mounted on a paint can and outfitted with a closure;
FIG. 3 is a plan view of the extension; and
FIG. 4 is an enlarged partial view of the rim construction of the closure, with the closure in place on the fitting.

DESCRIPTION OF PREFERRED EMBODIMENTS

Referring to the drawings, the extension fitting includes the body portion 11, wiper ring 15 which is mounted on the body portion by means of the supports 16, and the closure 17.

The body portion 11 includes sleeve 12 having a tapered lower end 14, and upper member or collar 13 having outwardly diverging inner surface 21, shoulder 19, and outwardly projecting lip 24.

Referring to FIG. 2, the fitting fits tightly on paint can 18, with the sleeve 12 in tight fitting engagement with the top of the container throughout the periphery of the container opening. The beveled end 14 of the sleeve 12 facilitates placement of the fitting on the container. The shoulder 19 of the fitting, abuts with the upper end 22 of the paint can, and overlies the groove 23 formed in the top portion of the paint can for receiving the lip of the paint can lid, as is conventional. This overlying relation of the shoulder 19 and groove 23 serves to prevent paint as might run over the sides of the fitting, from entering the groove 23. As can be seen in FIG. 1, the fitting is provided with slots 20 at spaced intervals along shoulder 19. These slots are for insertion of a prying tool, such as a screwdriver, between the fitting and the top of the paint can, to loosen the fitting for removal thereof.

Where, as in the case of gallon paint cans, a curved handle 28 is mounted on the can, the extension fitting can be suitably proportioned so that interference between the handle and the fitting does not occur.

The construction and mounting of the wiper ring is best illustrated in FIG. 2. The ring 15 is formed with a curved surface 26 so that wiping occurs along a surface, rather than along a sharp edge. Thus, wear of the paint bristles is reduced. The wiper supports 16 extend radially outwardly from the wiper ring to engagement with the collar 13.

The wiper ring 15 is disposed inwardly of the collar upper end portion, and is spaced from the collar. Desirably, the upper level 31 of the ring 15 is above the level of the top 32 of the collar 13. This difference can be about $\tfrac{1}{16}$–$\tfrac{1}{8}$ inch. It is desirable to have the top of the wiper ring disposed above the top of the collar as this relationship eliminates or reduces the likelihood that after the brush is wiped over the wiper ring, it will then be wiped over the upper edge of the collar.

The diameter of the wiper ring 15 is a feature of the invention. A large diameter is desirable since the larger the diameter, the less interference with access to the container. On the other hand, the wiper ring is disposed inwardly of the top of the collar 13 so that the annular passageway 30 is provided between the wiper ring and the fitting upper member. Any paint passing over the wiper ring falls through the annular space 30 onto diverging surface 21, and runs back into the container. Further, the one piece or integral construction of the fitting (insert member 12, collar 13, wiper 15 and supports 16) is facilitated by disposing the outwardly disposed surface 40 of the wiper ring 15 in alignment with or inwardly of the inwardly disposed surface 33 of the insert member 12. Thus, production by molding in a simple two-piece mold (i.e., a mold consisting essentially of but two parts, only one of which need be removable) is facilitated.

Particularly in an embodiment as illustrated, wherein the fitting is mounted in tight, sealing relation on the container, it is desirable to provide a closure 17, as this will permit leaving the extension fitting on the container during periods of storage, since the closure can be used to seal the contents. The releasable closure 17 is shown in place on the extension fitting in FIG. 2 and FIG. 4. The collar 13 is provided with an outwardly projecting lip 24 about the upper end thereof. The closure 17 is provided with an inwardly opening groove 25 (FIG. 4), the lip 24 being received in the groove 25 in tight fitting relation. The closure is of plyable material, for example, a polyolefin such as polyethylene, so that the lip and groove can be disengaged by manual manipulation. A pull tab 34, integral with the closure, can be provided to facilitate the putting on and taking off of the closure. In order to provide clearance between the closure 17 and the upper end 31 of the wiper ring 15, the closure can be provided with a spacer 35 providing the desired clearance. Further, the closure can be provided with sealing gasket 36, or, instead, an O-ring seal can be installed in the closure. If desired, the fitting can be coated with Teflon in known manner for example, by spraying. This will make the surfaces very smooth, facilitating removal of paint. Also, if desired, the fittings can be provided in different colors, the various colors corresponding to the paint colors, with, for example, a red fitting being used for red paint, etc.

What is claimed is:

1. An extension fitting for a container comprising:
    (a) a hollow cylindrical body portion including a lower member for insertion into the open top of the container to mount the fitting on the container in tight fitting relation,
    (b) said body portion further including a collar formed as an extension of said insert member and being integral therewith, and having an upwardly diverging inner surface,
    (c) a wiper ring disposed inwardly of the collar upper end portion, and spaced from the collar,
    (d) ring supports at circumferentially spaced positions securing the wiper ring in place and being integral with the hollow cylindrical body portion and the wiper ring,
    (e) the outwardly disposed surface of the wiper ring being not outwardly of the inwardly disposed surface of said insert member,
    (f) the lower end of the wiper ring being spaced from the cylindrical body portion, providing an opening for drainage from the collar to the container,
    (g) said insert member being a sleeve for receipt in tight fitting relation in the container opening with the sleeve outer surface frictionally engaging the inner surface of the container opening over the entire periphery of the container opening, whereby a seal is provided between the extension fitting and the container opening.

2. An extension fitting for a container, according to claim 1, the wiper ring terminating above the level of the top of the collar.

3. An extension fitting for a container, according to claim 2, and a closure releasably secured to the top of the collar in sealing relation, a spacer interposed between the top of the collar and closure holding the closure spaced from the upper end of the wiper ring.

4. An extension fitting for a container according to claims 1, 2 or 3, said outwardly disposed surface of the wiper ring being aligned with the inwardly disposed surface of the insert member.

5. An extension fitting for a container comprising:
    (a) a hollow cylindrical body portion including a lower member for insertion into the open top of the container to mount the fitting on the container in tight fitting relation,
    (b) said body portion further including a collar formed as an extension of said insert member, and having an upwardly diverging inner surface,
    (c) a wiper ring disposed inwardly of the collar upper end portion, and spaced from the collar,
    (d) ring supports at circumferentially spaced positions securing the wiper ring in place,
    (e) the lower end of the wiper ring being spaced from the cylindrical body portion, providing an opening for drainage from the collar to the container,
    (f) the wiper ring terminating above the level of the top of the collar,
    (g) a closuer releasably secured to the top of the collar in sealing relation, a spacer interposed between the top of the collar and closure holding the closure spaced from the upper end of the wiper ring.

6. An extension fitting according to claim 5,
    (a) said insert member being a sleeve for receipt in tight fitting relation in the container opening with the sleeve outer surface frictionally engaging the inner surface of the container opening over the entire periphery of the container opening, whereby a seal is provided between the extension fitting and the container opening.

7. An extension fitting for a container according to claims 5 or 6, said outwardly disposed surface of the wiper ring being aligned with the inwardly disposed surface of the insert member.

References Cited
UNITED STATES PATENTS

| | | | |
|---|---|---|---|
| 2,756,899 | 7/1956 | Crandall | 220—90 |
| 2,842,286 | 7/1958 | Beyer | 220—90 |
| 2,960,257 | 11/1960 | Sasse | 220—90 |
| 3,326,409 | 6/1967 | Speer | 220—90 |

RAPHAEL H. SCHWARTZ, Primary Examiner

U.S. Cl. X.R.

220—60